United States Patent [19]

Bruss

[11] Patent Number: 4,729,397

[45] Date of Patent: Mar. 8, 1988

[54] ELECTROMAGNETIC CONTROL VALVE FOR A PRESSURE FLUID AND ASSOCIATED METHOD

[75] Inventor: Karl-Heinz Bruss, Monchen Gladbach, Fed. Rep. of Germany

[73] Assignee: Pierburg GmbH & Co. KG, Neuss, Fed. Rep. of Germany

[21] Appl. No.: 943,642

[22] Filed: Dec. 17, 1986

[30] Foreign Application Priority Data

Dec. 17, 1985 [DE] Fed. Rep. of Germany ....... 3544527

[51] Int. Cl.$^4$ ............................................. G05D 16/00
[52] U.S. Cl. ................................. 137/82; 251/129.08; 251/129.21
[58] Field of Search ...................... 137/82; 251/129.08, 251/129.21

[56] References Cited

U.S. PATENT DOCUMENTS

| | | | |
|---|---|---|---|
| 2,947,284 | 8/1960 | Nicholson | 251/129.21 X |
| 3,413,997 | 12/1968 | Taylor | 137/85 |
| 3,621,862 | 11/1971 | Wojtecki | 137/82 |
| 3,795,383 | 3/1974 | Lombard | 251/129.21 X |
| 3,982,554 | 9/1976 | Saito | 137/82 |
| 4,556,085 | 12/1955 | Warrick | 251/129.21 X |
| 4,579,137 | 4/1986 | Brandt | 137/82 X |

Primary Examiner—Alan Cohan
Attorney, Agent, or Firm—Roberts, Spiecens & Cohen

[57] ABSTRACT

An electromagnetic control valve for controlling the discharge of pressure fluid as a function of electrical voltage applied to an magnetic circuit for the adjusting and regulating of the pressure in a pressure chamber, the electromagnetic force produced by the applied voltage acting in the closing direction of the valve while a hydraulic force from the pressure fluid acts in the opening direction thereof. The magnitude of the electromagnetic force in the closed position of the valve exceeds the force of the pressure fluid and the electromagnetic force is adjustable by varying the air gap in the magnetic circuit.

3 Claims, 1 Drawing Figure

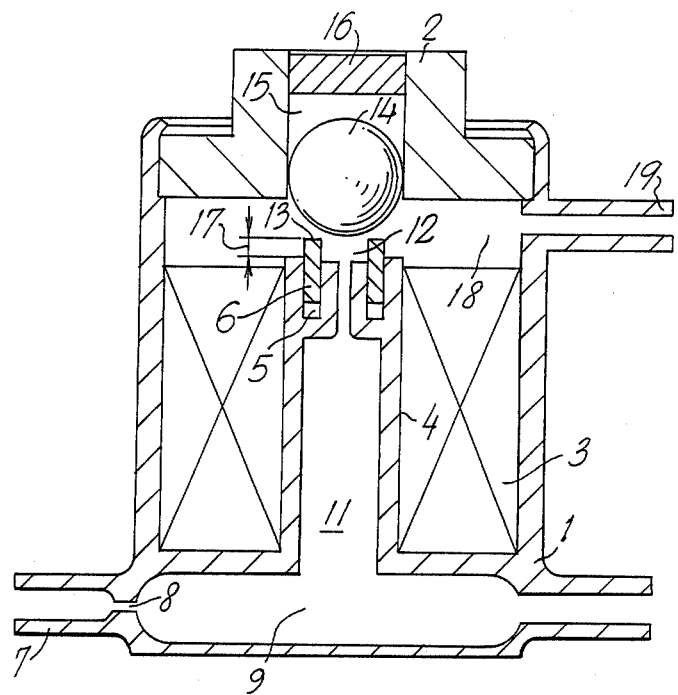

ELECTROMAGNETIC CONTROL VALVE FOR A PRESSURE FLUID AND ASSOCIATED METHOD

FIELD OF THE INVENTION

The invention relates to an electromagnetic control valve which controls the flow of pressure fluid from a pressure chamber in the valve as a function of electrical voltage applied to an excitation coil of the valve. More particularly, the invention relates to apparatus and methods for adjusting the forces applied to a valve body of the control valve.

PRIOR ART

A control valve is disclosed in DE-OS No. 33 09 713 and is utilized for controlling automobile automatic transmissions with electrical signal processing. In this respect, it is necessary that, as a function of the electric voltage applied to the excitation coil, the valve body of the control valve can assume any possible intermediate position in the range between the end points of its displacement, namely when the valve is closed and the valve is fully open.

In accordance with the disclosure in the above Application, that property is obtained by biassing the valve body with a spring which acts against the force of the electromagnetic excitation coil.

The excitation coil is made sufficienty large so that the valve body can be moved in the closing direction against the hydraulic pressure and against the action of the spring.

SUMMARY OF THE INVENTION

An object of the present invention is to provide a control valve of this type in which the same control performance can be obtained with a smaller excitation coil or where higher control performance can be obtained with the same excitation coil.

A further object of the invention is to provide a control valve which eliminates the need for a biassing spring.

Yet another object of the invention is to provide a control valve in which the forces applied to the valve body consist of the electromagnetic force produced by the voltage applied to the excitation coil and the force applied by the pressure fluid.

The above and further objects of the invention are satisfied by a construction of an electromagnetic control valve comprising a valve body controlling fluid flow and movable between open and closed positions, a magnetic circuit having an air gap and including an excitation coil energizable by a voltage to produce an electromagnetic force which acts on said valve body to urge the same to the closed position, a pressure chamber for a pressure fluid acting on said valve body with a force to urge the same to open position, the electromagnetic force being variable as a function of the voltage and having a position of the valve, and adjustable measure for adjusting the size of said air gap to regulate the magnitude of the electromagnetic force acting on the valve body in closed position.

The invention proceeds from the discovery that the conventional biassing spring can be eleminated if the resultant force acting on the valve body increases over the opening path. This can be obtained if the characteristic curve of the hydraulic force with respect to valve body displacement has a greater slope than the characteristic curve of the magnetic force. It is necessary that the valve characteristic and the electromagnetic force be adapted to each other. In accordance with the invention, the air gap present in the magnetic circuit is made adjustable for this purpose.

There are thus obtained a reduction in the size of the electric part and the elimination of the mechanical setting means such as, screws, and the like, which, in turn, results in a reduction in the weight of the armature whereby a longer life of the valve is obtained.

BRIEF DESCRIPTION OF THE FIGURE OF THE DRAWING

The sole figure of the drawing is a diagrammatic sectional view of an embodiment of an electromagnetic control valve according to the invention.

DETAILED DESCRIPTION OF A PREFERRED EMBODIMENT

The valve comprises a housing 1 of soft iron and a cover 2 of the same material which form a collector for magnetic lines of force which can be produced by an excitation coil 3. The excitation coil 3 is connected by electric wires (not shown) to a control circuit and the voltage applied to the coil 3 produces corresponding magnetic forces.

A hollow spindle 4 of the housing extends into the excitation coil 3 and has an upper end with a cylindrical recess 5 into which a bushing 6 of non-magnetic material is press-fit. The bushing 6 is capable of being forced more deeply into the recess 5 to a secured adjusted position as will be explained later. The lower part of the housing 1 has an inlet connection 7 for pressure fluid and a throttle 8 downstream of the inlet connection 7. A pressure chamber 9 is supplied with fluid under pressure from inlet connection 7 via throttle 8. The pressure chamber 9 is connected via an outlet pressure connection 10 to a load (not shown), for instance a setting device, and, via a channel 11 present in the spindle 4 to a recess or space 12 within the bushing 6.

A portion of the bushing 6 extends out of the recess 5 and forms a valve seat 13 for a valve body 14. The valve body is in the form of a ball, which acts as an armature in the air gap of the magnetic circuit. The ball 14 is guided axially in a cylindrical bore 15 in the cover 2. The bore 15 has a closure member 16 which is inserted into bore 15 after adjustment of the dimension 17 representing the projection of the bushing 6 from the spindle 4. Downstream of the valve seat 13 is a housing chamber 18 which is connected by a relief connection 19 to a pressure fluid reservoir at ambient pressure.

Adjustment of the valve is effected while the excitation coil 3 is energized by electric voltage and pressure fluid is supplied at inlet 7 and a pressure meter is attached to the pressure connection 10. The closure cover 16 is not yet inserted into bore 15. The ball 14 is pressed against the bushing 6 which has only been slightly inserted into recess 5 and the bushing is pressed further into the recess until the ball 14 is held by the magnetic force and the pressure which is established thereby in the pressure chamber 9 has reached a predetermined value which can be read from the pressure meter. In this way, the size of the air gap of the magnetic circuit, as represented by the distance 17, is established in relation to the value of the pressure at outlet connection 10 and with balanced forces acting on ball 14 to keep the ball on the seat 13 with minimum electromagnetic force.

The closure cover 16 is then inserted and secured in the bore 15.

The spindle 4 which supports the bushing 6 provides an advantageous guidance of the lines of force as that the ball 14 is axially pulled onto the valve seat 13 free of torsional twist. The contact forces are thus minimized and a hysteresis-free operation of the control valve is assured.

As evident from the above, the adjustability of the non-magnetic bushing 6 in the recess 5 provides means for adjusting the size of the air gap to regulate the magnitude of the electromagnetic force acting on ball 14 in the closed position. The adjustment is effected through the closable bore 15 and the bushing 6 is forceably displaced by application of external pressing force against the ball which is seated on bushing 6. The bushing 6 is frictionally retained in recess 5 in its adjusted position. The forces applied to the ball 14 during operation are substantially less than the external force applied to ball 14 when adjusting the air gap. In the closed position of the ball 14, the relief path of the pressure fluid to outlet 19 is closed and the pressure at outlet 10 is a maximum.

When the pressure at outlet 10 is to be reduced during operation of the valve, the electromagnetic force is reduced on the valve body by reducing the voltage applied to the excitation coil whereby the ball 14 is raised from seat 13 under the force or the pressure fluid to allow controlled flow of fluid to outlet 19.

Although the invention has been described in relation to a specific embodiment thereof it will become apparent to those skilled in the art that numerous modifications and variations can be made within the scope and spirit of the invention as defined in the attached claims.

What is claimed is:

1. An electromagnetic control valve for controlling the flow of pressure from a pressure chamber in which a pressure is established and controlled as a function of an electric voltage applied to an excitation coil, said valve comprising
   a valve body controlling fluid flow and movable between open and closed positions,
   a magnetic circuit having an air gap and including an excitation coil energizable by a voltage to produce an electromagnetic force which acts on said valve body to urge the same to the closed position,
   a pressure chamber for a pressure fluid acting on said valve body with a force to urge the same to the open position,
   the electromagnetic force being variable as a function of the voltage and having a value greater than the force of the pressure fluid in the closed position of the valve, and
   adjustable means for adjusting the size of said air gap to regulate the magnitude of the electromagnetic force acting on the valve body in closed position whereby to minimize the size of the valve and eliminate the need for a biassing spring,
   said magnetic circuit comprising a body of magnetic material, said adjustable means comprising a non-magnetic element displaceably supported in said body and projecting therefrom by a distance forming said air gap,
   said non-magnetic element facing said valve body and forming a seat therefor,
   said valve body being made of a magnetic material and forming an armature in said magnetic circuit which is attracted towards said seat by said electromagnetic force,
   said body of magnetic material including a spindle supporting said non-magnetic element and focussing magnetic lines of force therein,
   said valve body comprising a ball, said non-magnetic element being a tubular body facing said ball,
   said spindle having an annular groove in which said tubular body is displaceably inserted to a frictionally secured position.

2. A control valve as claimed in claim 1 wherein said spindle is hollow and communicates with said pressure chamber for applying the pressure of the fluid in said chamber onto the valve body.

3. A control valve as claimed in claim 2 wherein said body of magnetic material has a guide bore in which said ball is guided in its movement between the open and closed positions.

* * * * *